United States Patent [19]

Lupke et al.

[11] Patent Number: 5,573,787
[45] Date of Patent: Nov. 12, 1996

[54] MOLD APPARATUS WITH COOLING CHANNELS

[76] Inventors: Manfred A. A. Lupke, 92 Elgin Street, Thornhill, Ontario, Canada, L3T 1W6; Stefan A. Lupke, 32 Vintage Lane, Thornhill, Ontario, Canada, L3T 1Z6

[21] Appl. No.: 535,942
[22] Filed: Sep. 28, 1995
[51] Int. Cl.⁶ .......................... B29C 33/04; B29C 53/30
[52] U.S. Cl. .................... 425/233; 264/209.4; 425/326.1; 425/336; 425/384; 425/392; 425/396; 425/453
[58] Field of Search .................... 425/233, 335, 425/336, 337, 326.1, 325, 327, 388, 396, 453, 384, 392; 264/209.4, 508

[56] References Cited

U.S. PATENT DOCUMENTS

| | | | |
|---|---|---|---|
| 3,776,679 | 12/1973 | Hegler | 425/325 |
| 4,212,618 | 7/1980 | Hegler et al. | 425/233 |
| 4,226,580 | 10/1980 | Lupke et al. | 425/336 |
| 4,492,551 | 1/1985 | Hegler et al. | 425/233 |

FOREIGN PATENT DOCUMENTS

| | | |
|---|---|---|
| 1189269 | 6/1985 | Canada. |
| 0621120 | 10/1994 | European Pat. Off.. |

Primary Examiner—Jay H. Woo
Assistant Examiner—Joseph Leyson

[57] ABSTRACT

A mold apparatus has a plurality of sets of mold block parts which move to and from a product forming mold tunnel along the apparatus. Each set of mold block parts has at least one liquid receiving channel and a liquid supply is provided for supplying cooling liquid to the channel. The ends of the channel are open for feeding the cooling liquid into one end and draining the cooling liquid from the other end of the channel when the set of mold block parts is in the mold tunnel and seals are provided to prevent leakage of any cooling liquid trapped in the channel when the mold block parts are away from the mold tunnel.

11 Claims, 4 Drawing Sheets

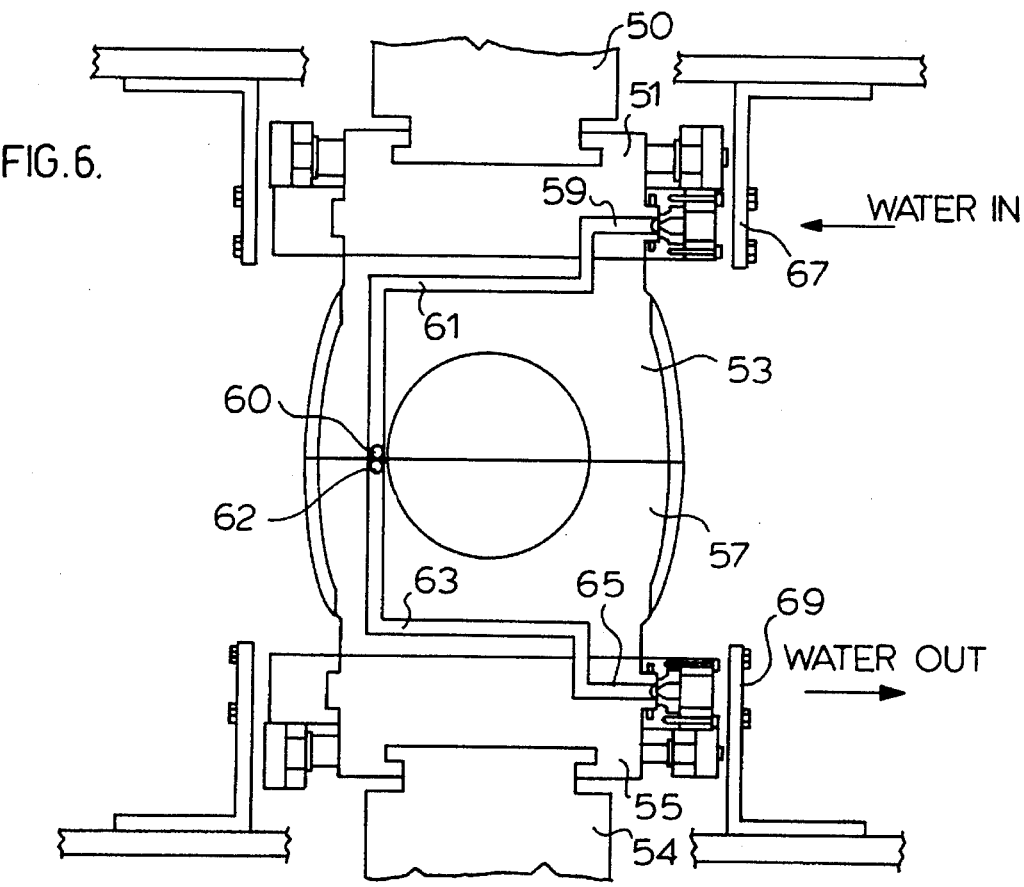
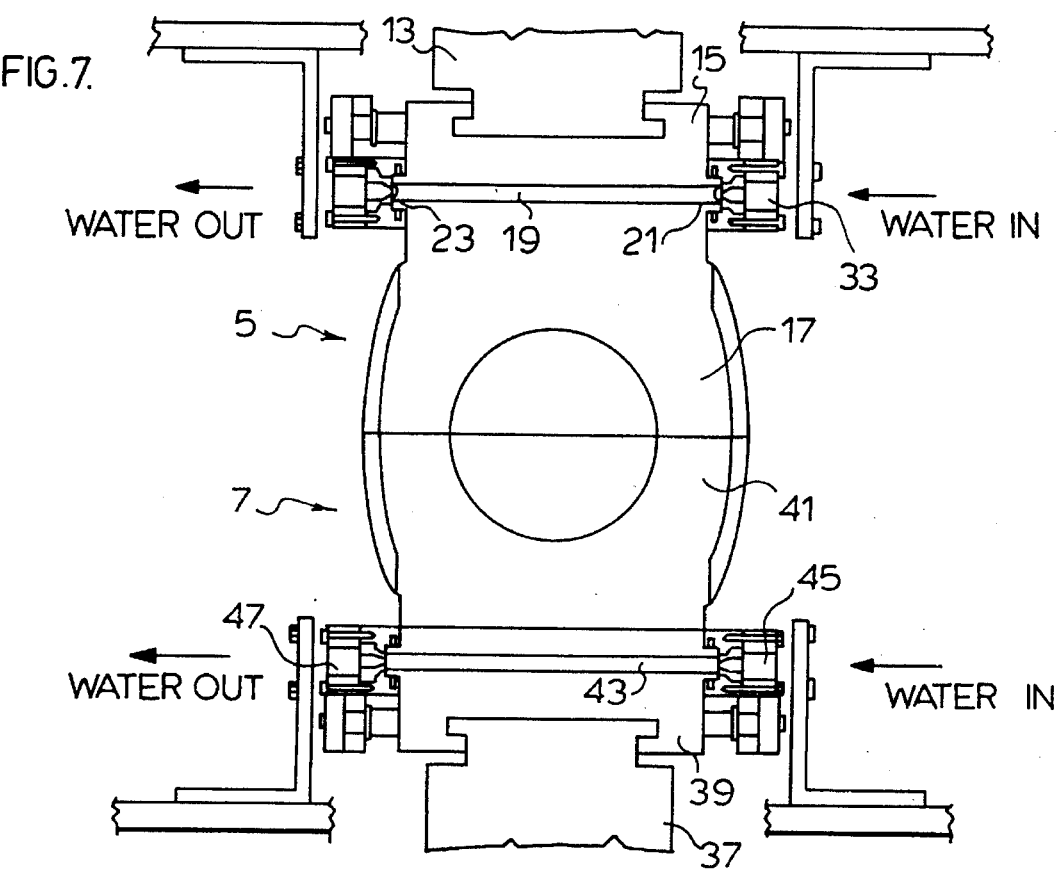

5,573,787

MOLD APPARATUS WITH COOLING CHANNELS

FIELD OF THE INVENTION

The present invention relates to a travelling mold apparatus and in particular a thermoplastic pipe forming mold apparatus with liquid cooling channels provided in the mold blocks.

BACKGROUND OF THE INVENTION

One type of molding apparatus which is used to form, or example, thermoplastic pipe comprises a plurality of mold parts which move around an endless track to and from a product forming mold tunnel. It is important to control the temperature of the mold tunnel in order to control the accuracy of the product formed in the tunnel. The product itself enters the tunnel at a very high temperature and it is critical that the temperature be lowered to the point that the product is stable as it emerges from the tunnel. One way of controlling the temperature through the tunnel is through the provision of cooling liquid fed to the mold block parts as they travel through the molding tunnel.

U.S. Pat. No. 4,492,551 issued Jan. 8, 1985 to Hegler describes a molding apparatus in which two sets of mold block sections are mounted to side by side endless chains supported by a mold bed. Each set of mold block sections includes liquid cooling channels opening at the underside of each mold block section. The bed is provided with a liquid supply along the mold tunnel which feeds up and into the channels in the mold block sections while they travel through the mold tunnel.

It is important that the flow of cooling liquid be controlled and it should not leak from the mold block sections while they are travelling around the mold apparatus. In the particular Hegler structure described above, the bed itself provides a seal against leakage. Each channel has a blind upper end and is only open at its lower end. The channels do not extend between mating mold block sections thereby limiting the flow of cooling liquid from each channel to its respective mold block section and requiring separate liquid feeds for each channel. As the mold block sections leave the mold tunnel, the bottom opening channels are sealed by the bed itself.

There are currently available, other types of travelling mold apparatus which do not use a supporting bed and are therefore not limited to travelling in a horizontal plane. For example, there is currently available one type of molding apparatus which comprises first and second vertically stacked endless tracks of mating mold block sections which meet between the two tracks to form a moving mold tunnel. Another such apparatus is one in which hinged mold block sections move around a single endless track and close with one another on one side of the track to form a moving mold tunnel. Neither of these apparatuses could be fitted with the cooling channels of the Hegler structure because they do not have a supporting bed for supplying cooling liquid to the cooling channels and for sealing off the cooling channels when they are away from the mold tunnel.

SUMMARY OF THE INVENTION

The present invention relates to cooling channels in a mold apparatus which does not require the use of a supporting bed to control liquid flow through the channels. More particularly, a mold apparatus of the present invention has a plurality of sets of mold block parts which move to and from a product forming mold tunnel along the apparatus. Each set of mold block parts has at least one liquid receiving channel and a liquid supply is provided for supplying cooling liquid to the channel. Opposite ends for the channel are open for feeding the cooling liquid into one end and for draining the cooling liquid from the other end of the channel when the mold block parts are in the mold tunnel. The ends of the channel are then sealed to prevent leakage of any of the cooling liquid trapped in the channel when the mold block parts are away from the mold tunnel.

The use of cooling channels which are open at opposite ends when the mold block parts are in the mold tunnel enables the channels to open at one location and then drain at another location. This in turn allows various different set ups and locations for the channels rather than limiting the channels to a specific orientation as found in the prior art.

BRIEF DESCRIPTION OF THE DRAWINGS

The above as well as other advantages and features will be described in greater detail according to the preferred embodiments of the present invention in which;

FIG. 6 is a sectional view through mated mold block sections as they move through the molding tunnel of the mold apparatus according to a further preferred embodiment of the present invention;

FIG. 7 is a sectional view through mated mold block sections as they move through the mold tunnel of a mold apparatus according to still a further preferred embodiment of the present invention;

DETAILED DESCRIPTION ACCORDING TO THE PREFERRED EMBODIMENTS OF THE PRESENT INVENTION

Figure 1:
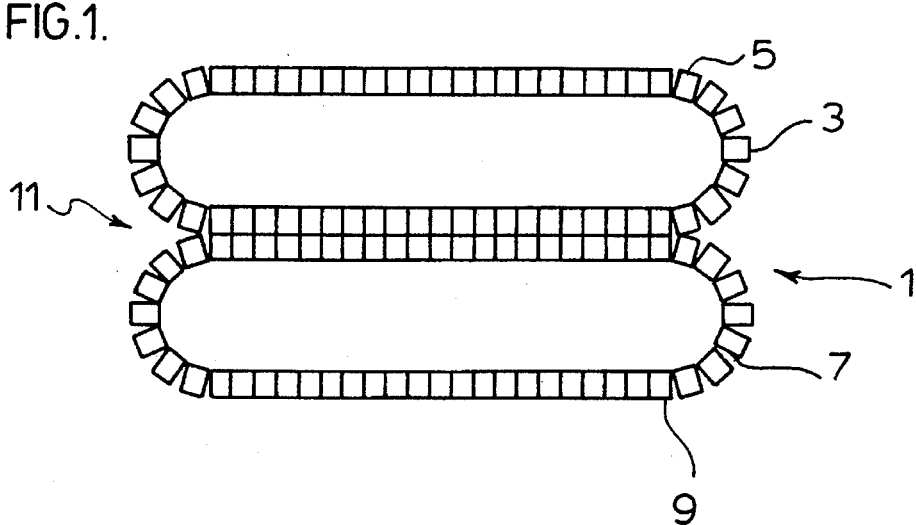
FIG. 1 is a side view of a mold apparatus provided with cooling channels according to a preferred embodiment of the present invention.

FIG. 1 shows a pipe molding apparatus generally indicated at 1. This particular apparatus comprises an upper endless track 3 around which mold parts 5 are mounted and a lower track 7 to which mold parts 9 are mounted. The mold parts 5 and 9 move around their respective tracks and meet with one another between the tracks to form a moving mold tunnel generally indicated at 11. As is known in the art an extruder which is not shown is provided at one end of the tunnel and formed pipe which also is not shown exits at the other end of the tunnel.

Figure 2:
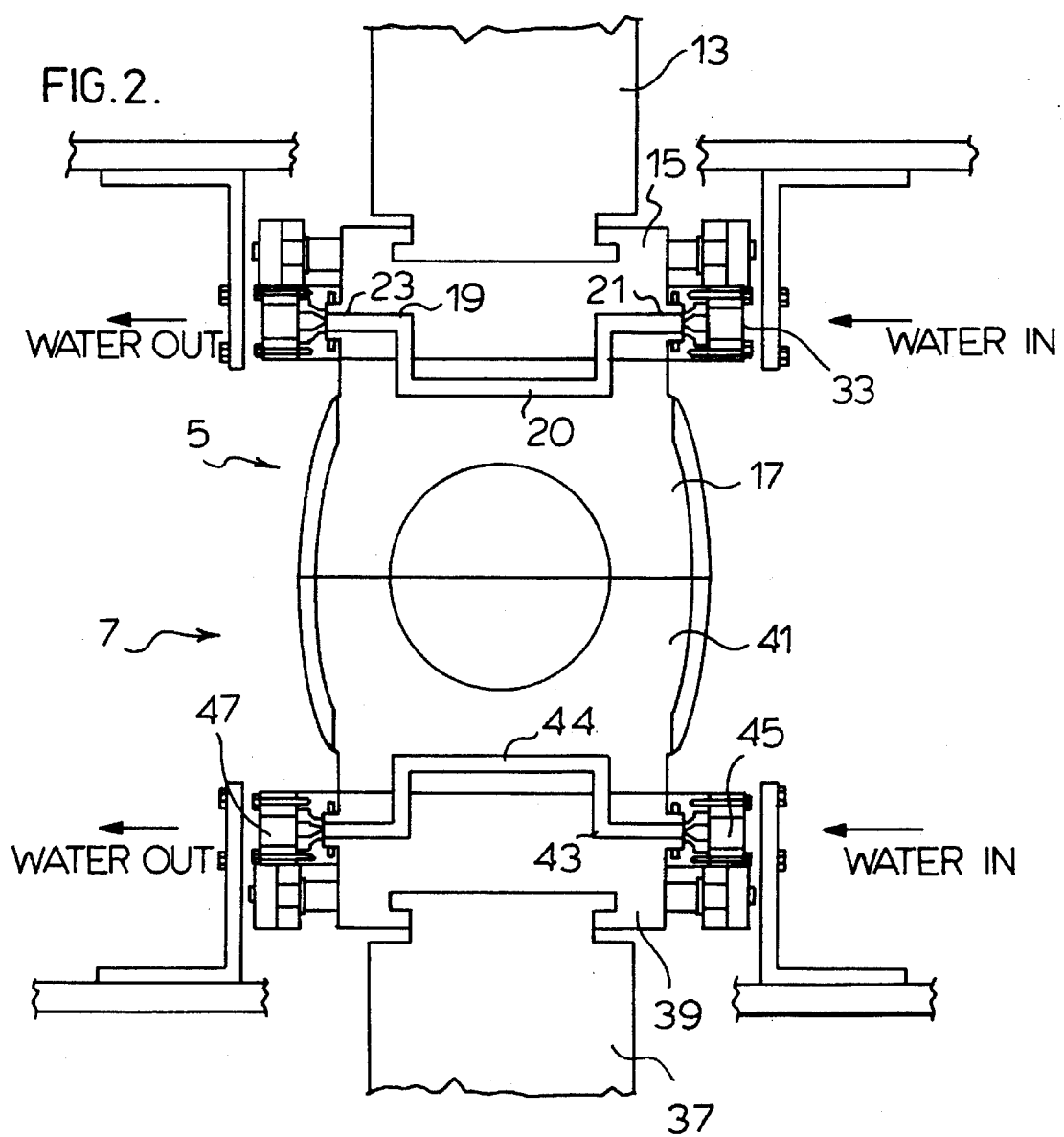
FIG. 2 is an enlarged sectional view through the mold tunnel of the mold apparatus of FIG. 1.

FIG. 2 shows one set of mold block parts mating with another as they pass through the mold tunnel 11. The sets of mold block parts include an upper mold block section 17 and a lower mold block section 41 which close with one another to form part of the mold tunnel.

The upper mold block section 17 is mounted to a mold block carrier 15 which is movably supported by upper housing 13 of the apparatus and carried around the housing by the moving track 3. The lower mold block section 41 is mounted to a carrier 39 supported by lower housing 37 and moved around the lower housing by a track 9.

The use of the intermediate carriers between the mold block sections and their respective bases enables an existing mold apparatus to be fitted with add on liquid cooling channels as to be described below.

Here it should be noted that each of the mold apparatuses described below uses separate vacuum channels in the formation of the product, e.g. plastic pipe through the mold tunnel. However, the vacuum channels do not form part of the present invention and therefore have not been shown in the drawings.

Returning to FIG. 2, it will be seen that the upper carrier 15 is provided with a liquid receiving channel 19 having first and second ends 21 and 23. A section of the channel indicated at 20 drops down directly into mold block section 17.

Figure 3:
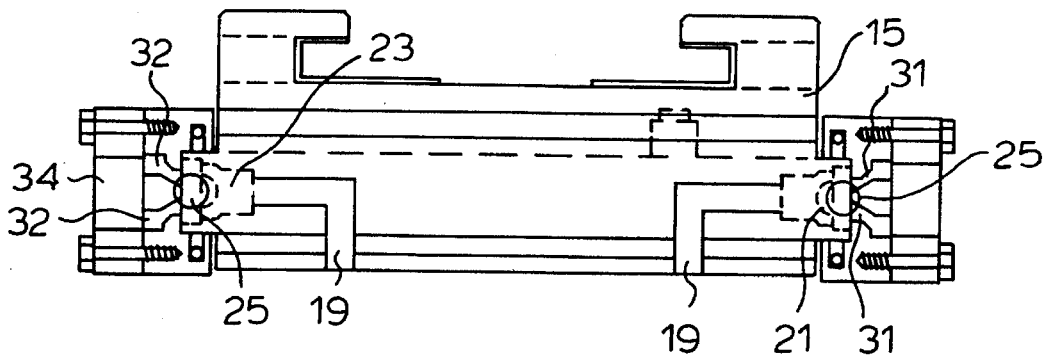
FIG. 3 is an enlarged sectional view through one of the mold carriers used from FIG. 2.
Figure 4:
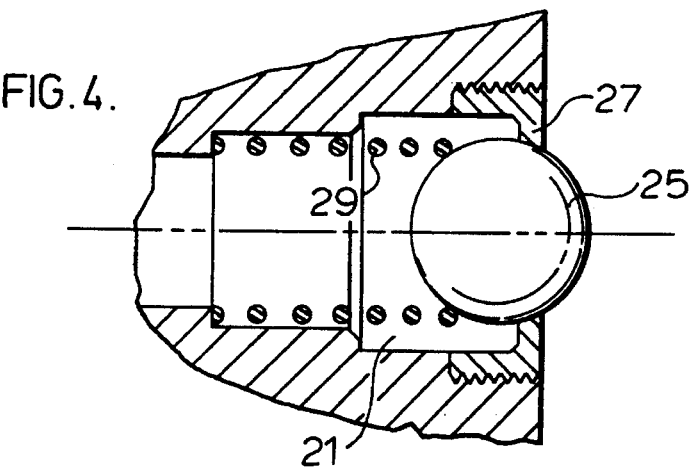
FIG. 4 is an enlarged sectional view of a check valve used at one end of one of the cooling channels through the carrier of FIG. 3.
Figure 5:
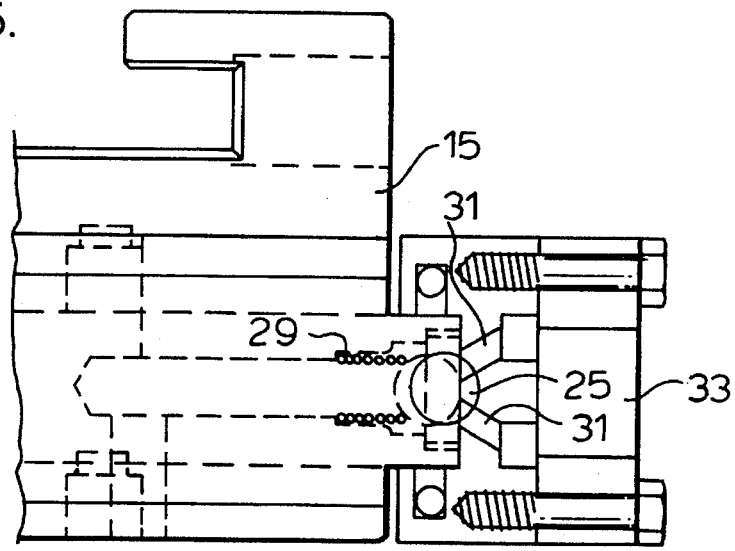
FIG. 5 is an enlarged sectional view through one end of the carrier of FIG. 3 showing operation of the check valve of FIG. 4.

FIGS. 3 through 5 show, in detail, the first end 21 of channel 19. In these Figures it will be seen that the first end of the channel is fitted with a ball check valve 25 normally seated against a seal 27 by means of a spring 29. The same ball seal and spring arrangement is also provided at the second end 23 of the channel best shown in FIG. 3 of the drawings.

When the mold block sections are away from the mold tunnel, the two ball valves 25 at the first and second ends of the channel are closed to seal off the ends of the channel as shown in FIG. 4 of the drawings. However, as the moving mold parts enter the mold tunnel, the ball valves at the opposite ends of the channel are opened for receiving cooling liquid at the first end and for draining the cooling liquid from the second end of the channel. This is best seen in reference to FIG. 5 of the drawings which shows a liquid supply panel 33 which extends lengthwise along the mold tunnel. This liquid supply panel includes combination liquid feeders and pressure applicators 31 which force the ball valve 25 at the first end of the channel to move from its sealing position as shown in solid lines to an open position as shown in dotted lines in FIG. 5. When the ball valve is pushed to the open position, liquid, preferably cooling water, is fed under pressure through members 31 directly into the first end 21 of channel 19. In the arrangement shown in FIG. 2 of the drawings, the water flows through channel region 20 directly in the mold block section and then back to the second end 23 of the channel 19. The ball valve 25 at the second end of the channel is also open as the mold block parts move through the mold tunnel through a very similar arrangement to that provided at the first end of the channel. As seen in FIG. 3, pressure applicators 32 push the ball valve at the second end of the channel to the open position and in this case, the pressure applicators 32 rather than feeding liquid provide a liquid drainage through a drain panel 34 at the side of the mold tunnel opposite the liquid supply panel.

The pressure used to feed the cooling liquid through the channel can be in the form of a pump either pushing cooling liquid, preferably water, into the channel or pulling the liquid from the channel. The use of negative pressure to pull liquid through the channel has the advantage that it tends to also pull on the seals through the system thereby precluding leakage of the cooling liquid.

The liquid drained from the cooling channel can be fed back to the original liquid supply thereby providing a closed system in which the cooling liquid is recirculated after it has had an opportunity to cool down. If required, the recirculated liquid can be passed through a cooling system before it is recirculated.

FIG. 2 of the drawings, shows that a liquid supply panel 45 and a drain panel 47 are also provided for the lower mold parts on opposite sides of the molding apparatus. These two panels cooperate with identical ball valves provided at opposite ends of a cooling channel 43 provided at the lower carrier 39. Channel 43, like the upper channel includes a channel region 44 which runs directly through mold block section 41.

As will be appreciated from the above, the identical liquid circulation as described with respect to the upper mold parts also occurs at the lower mold parts as they move through the mold tunnel. When the mold parts leave the mold tunnel, all pressure is relieved from the check valves which move back to their sealing positions and any liquid which remains trapped in the channels is prevented from leaking by the check valves. When the mold block parts are in the mold tunnel, the ends of the channel seal against the supply and drainage panels to prevent leakage in the tunnel.

Although the sectional view of FIG. 2 only shows one channel at both the upper and lower mold block parts, it is to be appreciated that a series of these channels may be provided spaced from one another lengthwise of each set of mold block parts. In other words, each carrier and mold block section may well be provided with two or more cooling liquid receiving channels.

FIG. 6 of the drawings shows cooperating mold parts having mated mold block sections with a different cooling channel arrangement. More particularly, an upper mold block section 53 is mounted by a movable carrier 51 to its supporting housing 50. A lower mold block section 57 which closes with mold block section 53 in the mold tunnel is mounted by movable carrier 55 to its supporting housing 54.

In the arrangement shown in FIG. 6, the liquid cooling channel itself starts from the first end of the channel 59 provided in upper carrier 51 and continues through channel region 61 which extends across and then downwardly through mold block section 53. A second region of the channel which is indicated at 63 continues down through and then across the lower mold block section 57. This channel region 63 feeds to the second end 65 of the channel in the lower carrier 55.

A liquid supply panel 67 feeds liquid to the first end 59 of the channel. This liquid flows through the two channel regions 61 and 63 of the upper and lower mold block sections and because of the overall length of the channel provides substantial cooling capacity to the two mold block sections. The cooling liquid is then drained out through the second end 65 of the channel.

Each of the channel ends 59 and 65 is provided with the identical check ball valve arrangement shown in FIG. 4 of the drawings. A liquid supply panel 67 cooperates with the check valve at the first end 59 of the channel and a liquid drainage panel 69 cooperates with the check valve at the second end 65 of the channel again in the identical fashion to that described above. However, in this case, both the liquid supply and the drainage occur on the same side of the mold tunnel.

FIG. 6 shows that the two channel regions are provided with spring loaded check valves 60 and 62 which push on and open one another while the upper and lower mold block sections 53 and 57 are mated through the mold tunnel. Once the two mold block sections leave the mold tunnel, the check valves 60 and 62 automatically move to a sealing position to prevent leakage of any liquid which might be trapped in the respective channel regions.

Another method of controlling leakage from the two channel regions after they leave the mold tunnel is to cut off the liquid supply before the mold block sections reach the end of the mold tunnel and use the vacuum applied through the channel to substantially completely drain the channel before the mold block sections separate from one another.

FIG. 7 shows a setup substantially the same as that shown in FIG. 2 except that in FIG. 7, the cooling channels 19 and 43 traverse directly through the two carriers 15 and 39 without going into the mold block sections.

Figure 8:
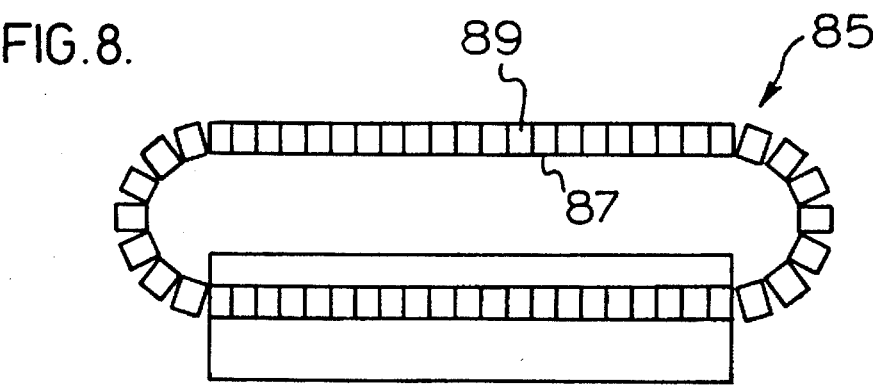
FIG. 8 is a side view of a mold apparatus according to yet a further preferred embodiment of the present invention.
Figure 9:
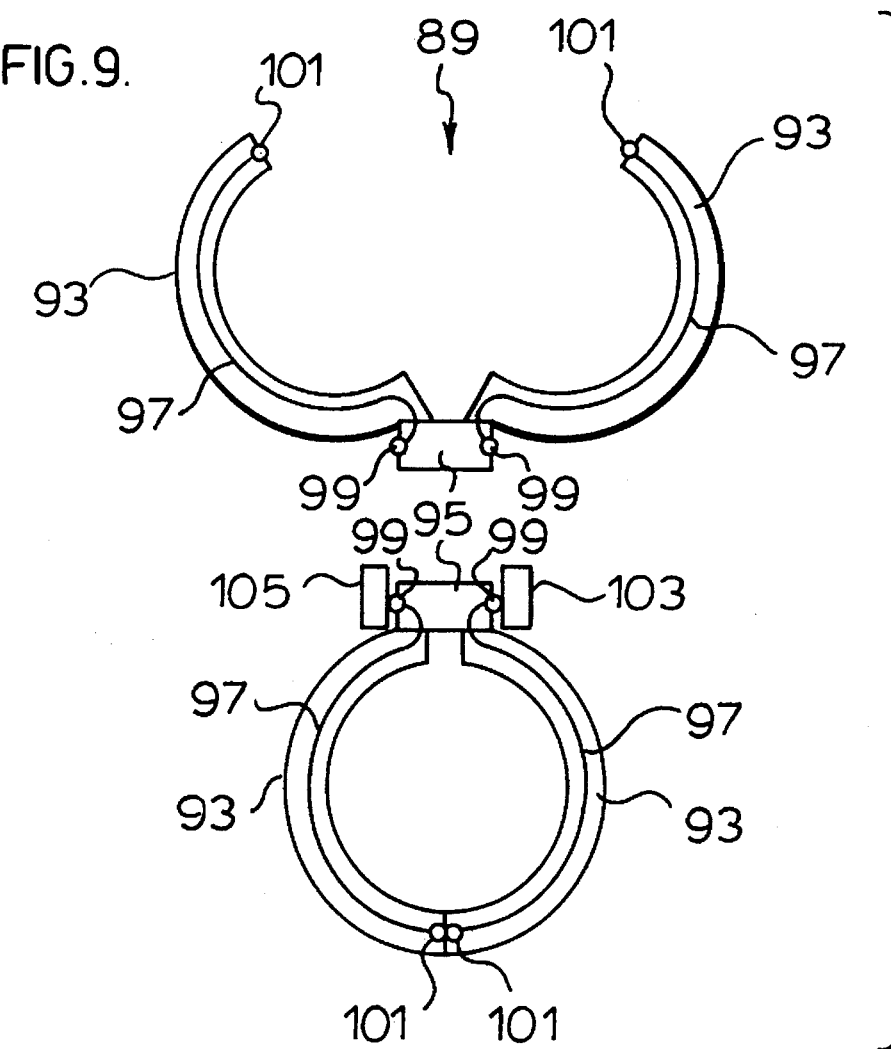
FIG. 9 is a sectional view through the mold tunnel of the mold apparatus of FIG. 8.

FIG. 8 of the drawings show a molding apparatus generally indicated at 85 modified from that shown in FIG. 1. Molding apparatus 85 uses a single endless track 87 to which are mounted a plurality of side by side mold blocks 89 which travel around track 87. Each mold block 89 comprises a pair of mold block sections 93 hingedly secured to a base 95 mounted directly to the track. Mold block sections 93 close relative to one another to form a mold tunnel along the underside of the track 87 and are opened relative to one another along a return path to the mold tunnel at the upperside of the track as best seen in FIG. 9 of the drawings.

Each of the mold block sections 93 is provided with a partial liquid cooling channel 97. The opposite ends of channel 97 are closed by spring loaded ball valves 99 and 101 when the mold block sections are opened along the upper reach of track 87. However, as the mold block sections close with one another along the lower reach of the track to form the mold tunnel, the base 95 to which the mold block sections are hingedly mounted rides between a liquid supply panel 103 and a liquid drainage panel 105 on opposite sides of the mold apparatus which open the ball valves 99. Also, as the two mold sections close with one another the ball valves 101 are pushed into an open position by their engagement with one another as seen in the lower part of FIG. 9. Cooling liquid is fed from the liquid supply panel 103 through the two mated channel regions 97 of the respective mold sections 93 past the open ball valves 101 and through to the liquid drainage panel 105.

The liquid supply and the drainage panel open the two ball valves in the base of the mold block sections in the same manner as that described with respect to the earlier embodiment thereby allowing the flow of cooling liquid through the closed mold block in the mold tunnel.

When the mold block formed by the two mold sections 93 moves away from the mold tunnel, the two check valves 99 in the base of the mold block as well as the two check valves 101 at the end of the mold block sections are free to move back to their sealing positions, thereby trapping any remaining liquid within the mold block sections and preventing leakage of the liquid away from the mold tunnel.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A mold apparatus having a plurality of sets of mold block parts which move to and from a product forming mold tunnel along said apparatus, each set of mold block parts having at least one liquid receiving channel, a liquid supply for supplying cooling liquid to said channel, said channel having opposite ends which are respectively open for feeding the cooling liquid into one end and draining the cooling liquid from the other end of said channel when said mold block parts are in said mold tunnel, and sealing means being provided to seal said opposite ends of said channel and to prevent leakage of any cooling liquid trapped in said channel when said mold block parts are away from said mold tunnel.

2. A mold apparatus as claimed in claim 1, wherein each set of mold block parts comprises a pair of mold sections which open and close with one another, said sections when closed forming part of said mold tunnel, and each section being mounted on a supporting base.

3. A mold apparatus as claimed in claim 2, wherein each mold section is mounted on its base by an intermediate carrier.

4. A mold apparatus as claimed in claim 2, including a pair of channels, one at each base of each mold section.

5. A mold apparatus as claimed in claim 4, wherein each channel begins at the base, extends into the mold section and then terminates at the base.

6. A mold apparatus as claimed in claim 4, wherein each channel extends from side to side through the base without entering the mold block section.

7. A mold apparatus as claimed in claim 3, including a pair of channels one at each intermediate carrier.

8. A mold apparatus as claimed in claim 7, wherein each channel begins at the intermediate carrier, extends into the mold section and then terminates at the intermediate carrier.

9. A mold apparatus as claimed in claim 7, wherein each channel extends from side to side through the intermediate carrier without entering the mold section.

10. A mold apparatus as claimed in claim 2, wherein said channel enters from one side of said apparatus at the base of one of said mold sections of said pair, extends through both mold sections of said pair and terminates at the base of the other of said mold sections at said one side of said apparatus.

11. A mold apparatus as claimed in claim 1, wherein said sealing means comprises a spring loaded check valve at each end of said channel and a pressure applicator for pressing on and opening each check valve when said set of mold block parts is moving through said mold tunnel, each check valve being seated on a seal when away from said mold tunnel.

* * * * *